No. 738,738. PATENTED SEPT. 8, 1903.
C. A. TOWER.
CAR COUPLING.
APPLICATION FILED JULY 10, 1903.
NO MODEL.
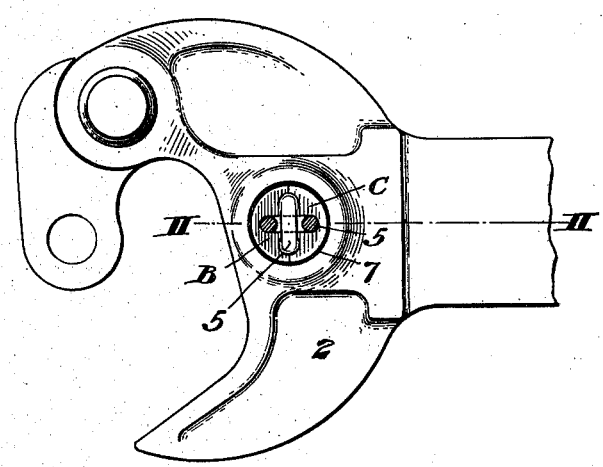
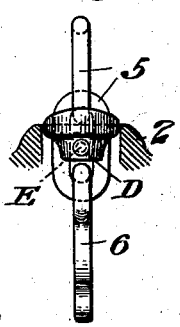
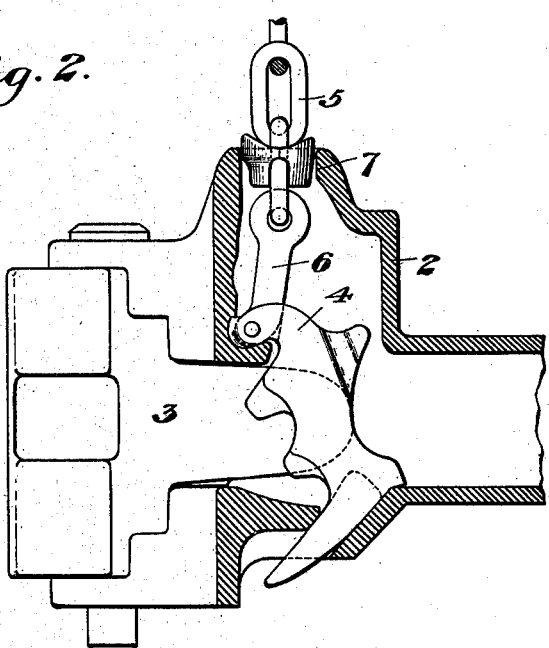
WITNESSES
INVENTOR
C. A. Tower
by Bakewell & Byrnes
his attorneys No. 738,738. Patented September 8, 1903.

UNITED STATES PATENT OFFICE.

CLINTON A. TOWER, OF CLEVELAND, OHIO, ASSIGNOR TO THE NATIONAL MALLEABLE CASTINGS COMPANY, A CORPORATION OF OHIO.

CAR-COUPLING.

SPECIFICATION forming part of Letters Patent No. 738,738, dated September 8, 1903.

Application filed July 10, 1903. Serial No. 164,947. (No model.)

*To all whom it may concern:*

Be it known that I, CLINTON A. TOWER, of Cleveland, Cuyahoga county, Ohio, have invented a new and useful Car-Coupler, of which the following is a full, clear, and exact description, reference being had to the accompanying drawings, forming a part of this specification, in which—

Figure 1 shows my coupler in plan view. Fig. 2 is a vertical longitudinal section on the line II II of Fig. 2. Fig. 3 is a detail view of the stopper for the chain-hole. Fig. 4 is a vertical section of the stopper.

The purpose of my invention is to provide means for closing the hole in the head of an automatic coupler for the passage of the chain by which the locking or locking and opening device is operated. The means heretofore suggested for this purpose, so far as I am aware, have been unsatisfactory and objectionable.

In the drawings I show my invention applied to a car-coupler for which Letters Patent No. 728,182 were granted to me on the 12th day of May, 1903; but it may be applied to couplings of other construction.

2 represents the coupler-head, 3 is the pivoted knuckle, and 4 is a locking-piece, which, as described in my said patent, may serve also as an opening device for the knuckle. The lifting device shown in the drawing consists of a chain 5, the lower link 6 of which is connected with the lock 4, its upper end being connected with a lifting-crank. It passes through a hole 7 in the head of the coupler. For the purpose of closing this hole I employ a stopper, which, as shown in Figs. 3 and 4, is preferably made of two parts B and C, divided vertically and adapted to be fitted together around one of the links of the chain. One of the parts, C, has a projection D, which extends through a hole E in the other part, B, and when the two parts are assembled around the chain-link the projection D is upset, so as to constitute a rivet by which the parts of the stopper are fixed together. The parts may be connected with a separate rivet passing through a hole in each part, and when a lifting link or rod is employed instead of a chain the stopper may be applied thereto or made integral therewith with like effect, as when used on a chain. The stopper when fastened on the chain becomes a fixture thereon. It is so placed thereon that when the lock is in its lowermost position, locking the knuckle, the stopper fits within the hole 7 and closes it. It is then upheld by the link 6, which occupies an upright position. The stopper is of little less diameter than the hole 7, so that when the lock is removed from the coupler for repair or for any other purpose the stopper need not be detached, but can be drawn down with the chain through the hole 7. This is an important advantage, and in prior caps or stopping devices where it is not employed the stopper must be removed from the chain before the chain can be passed downwardly through the hole. When the stopper is in the hole, it effectually excludes dirt and snow from entering the coupler-head, and as it is simple and easily applied it does not complicate the mechanism or otherwise cause any difficulty of operating or repairing the coupling.

Within the scope of my broader claims the parts may be modified in form and construction, since

What I claim is—

1. A stopper for couplers comprising in combination with a lifting device, a stopping-plug adapted to fit thereon within the usual hole in the coupler-head, but of less diameter than said hole; substantially as described.

2. A stopper for couplers comprising in combination with a lifting device, a stopping-plug adapted to fit within the usual hole in the coupler-head, said stopper being made in parts fixed together upon the lifting device; substantially as described.

3. A stopper for couplers comprising in combination with a lifting device, a stopping-plug adapted to fit within the usual hole in the coupler-head, said stopper being made in parts fixed together upon the lifting device, one of said parts having a projection fitting in the other, and upset; substantially as described.

4. A stopper for couplers comprising in combination with a lifting device, a stopping-plug adapted to fit within the usual hole in the coupler-head, but of less diameter than said hole, and means for supporting the stopper in position in the hole; substantially as described.

5. A stopping-plug for couplers adapted to fit within the usual hole in the coupler-head, but of less diameter than said hole; substantially as described.

In testimony whereof I have hereunto set my hand.

CLINTON A. TOWER.

Witnesses:
HENRY F. POPE,
HARRY E. ORR.